(12) United States Patent  
Purfuerst et al.

(10) Patent No.: US 9,059,651 B2  
(45) Date of Patent: Jun. 16, 2015

(54) DETERMINING ROTOR POSITION IN SENSORLESS SWITCHED RELUCTANCE MOTORS

(71) Applicant: Melexis Technologies NV, Tessenderlo (BE)

(72) Inventors: Sandro Purfuerst, Ilmenau (DE); Thomas Freitag, Plaue (DE); Veit Zöppig, Langewiesen (DE); Tom Ströhla, Ilmenau (DE)

(73) Assignee: MELEXIS TECHNOLOGIES NV, Tessenderlo (BE)

( * ) Notice: Subject to any disclaimer, the term of this patent is extended or adjusted under 35 U.S.C. 154(b) by 131 days.

(21) Appl. No.: 13/644,539

(22) Filed: Oct. 4, 2012

(65) Prior Publication Data

US 2013/0082630 A1 Apr. 4, 2013

Related U.S. Application Data

(60) Provisional application No. 61/542,978, filed on Oct. 4, 2011.

(30) Foreign Application Priority Data

Apr. 13, 2012 (GB) .................................. 1206590

(51) Int. Cl.
| | | |
|---|---|---|
| *H02P 6/00* | (2006.01) | |
| *H02K 29/06* | (2006.01) | |
| *H02P 6/18* | (2006.01) | |
| *H02P 25/08* | (2006.01) | |

(52) U.S. Cl.
CPC ........ *H02P 6/18* (2013.01); *H02P 6/186* (2013.01); *H02P 25/083* (2013.01)

(58) Field of Classification Search
USPC ........ 318/400.2, 400.32, 400.33, 400.4, 701, 318/804

See application file for complete search history.

(56) References Cited

U.S. PATENT DOCUMENTS

| | | | | |
|---|---|---|---|---|
| 4,477,757 | A * | 10/1984 | Palombo et al. | 318/696 |
| 5,537,308 | A * | 7/1996 | Gritter | 363/95 |
| 5,793,179 | A | 8/1998 | Watkins | |
| 5,859,518 | A | 1/1999 | Vitunic | |
| 5,949,210 | A * | 9/1999 | Gataric et al. | 318/609 |
| 6,014,006 | A * | 1/2000 | Stuntz et al. | 318/804 |

(Continued)

FOREIGN PATENT DOCUMENTS

| | | |
|---|---|---|
| EP | 1 526 635 A2 | 4/2005 |
| GB | 2 455 122 A | 6/2006 |

OTHER PUBLICATIONS

Indirect Measurement of Motor Current Derivatives in PMSM Sensorless Drives, Elektronika IR Elektrontechnika, ISSN 1392-1215, vol. 20, No. 7, 2014.*

(Continued)

*Primary Examiner* — Paul Ip  
(74) *Attorney, Agent, or Firm* — Bacon & Thomas, PLLC

(57) ABSTRACT

A method for determining the position of a moving rotor in a switched reluctance motor includes the steps of applying a voltage to a phase winding of the reluctance motor, sampling a signal representative of the current magnitude in this phase winding, detecting a feature of the second temporal derivative of the signal, and determining the position of the moving rotor taking into account the occurrence of this feature. Apparatus for carrying out the method is described.

11 Claims, 3 Drawing Sheets

(56) References Cited

U.S. PATENT DOCUMENTS

| | | | |
|---|---|---|---|
| 6,225,769 B1* | 5/2001 | Brenner et al. | 318/434 |
| 6,229,278 B1* | 5/2001 | Garces et al. | 318/801 |
| 6,586,903 B2 | 7/2003 | Moriarty | |
| 6,959,969 B2* | 11/2005 | Simpson et al. | 303/20 |
| 6,979,974 B2 | 12/2005 | Slater et al. | |
| 7,444,248 B2* | 10/2008 | Premerlani et al. | 702/64 |
| 8,471,552 B2* | 6/2013 | Suzuki | 324/207.25 |
| 2001/0010452 A1 | 8/2001 | Moriarty | |
| 2004/0085117 A1* | 5/2004 | Melbert et al. | 327/432 |
| 2004/0178763 A1* | 9/2004 | Kuwano et al. | 318/685 |
| 2004/0212359 A1 | 10/2004 | Slater et al. | |
| 2004/0245983 A1* | 12/2004 | Mayes | 324/207.16 |
| 2005/0263330 A1* | 12/2005 | Gallagher et al. | 180/65.1 |
| 2006/0197396 A1 | 9/2006 | Pollock et al. | |
| 2006/0247874 A1* | 11/2006 | Premerlani et al. | 702/64 |
| 2008/0211450 A1* | 9/2008 | Yamada et al. | 318/801 |
| 2010/0321006 A1* | 12/2010 | Suzuki | 324/207.25 |

OTHER PUBLICATIONS

Simplified Sensorless Control for BLDC Motor, Using DSP Technology by Juan W. Dixon, Matias Rodrigues, and Rodrigo Herta, Copy Right 2002 EVS19.*

Robust Sensorless Control of BLDC Motor using Second Derivative Function of the Sum of Terminal Voltages, Serbian Journal of Electrical Engineering, vol. 10, No. 2, Jun. 2013, 275-291.*

Great Britain Search Report in Application No. GB1206590.0, dated Jul. 30, 2012.

European Search report in Application No. 12187170.1-1809, dated Feb. 27, 2013.

* cited by examiner

DETERMINING ROTOR POSITION IN SENSORLESS SWITCHED RELUCTANCE MOTORS

FIELD OF THE INVENTION

The present invention relates to the field of switched reluctance motors. More specifically it relates to deriving commutation information in sensorless driven switched reluctance motors from a current profile, e.g. without prior knowledge of integral motor parameters such as inductance, resistance, flux linkage or inertia.

BACKGROUND OF THE INVENTION

In switched reluctance motors, a power stage provides a constant or variable current to opposite windings of the motor such that a ferromagnetic rotor, e.g. an iron rotor, moves to a position in which the inductance of the excited winding is maximized. A controller stage may calculate the position information of the iron rotor on one hand and provide control signals to the power stage on the other hand, e.g. a control signal triggered by a commutation point which may be determined by the position information. By creating a rotating electro-magnetic field in the stator, a rotation of the rotor may be achieved.

The rotor position information may be determined by a sensor-based method, e.g. from a discrete external sensing unit based on position sensors. This information may alternatively be determined by a sensorless method, e.g. by observing electric and/or magnetic parameters of the motor during motion of the rotor. Sensorless methods are known in the art which use flux integration, observer based methods, fuzzy logic, neural networks and/or induced voltage in order to estimate the mechanical rotor angle. Other known algorithms may rely on inductance based methods, in which the position may be reconstructed through analyzing an induced current waveform, which is a function of rotor angle and current. An example of such an inductance based method is disclosed in U.S. Pat. No. 5,859,518, which describes phase current commutation based on a threshold condition on the observed current.

It is known in the art that the inductance is dependent on the rotor position, but also on the current itself. Sensorless methods based on inductance measurements may be known which handle this problem by complex look up tables. However, such approach may require an initial calibration of the system and/or detailed knowledge of mechanical, electric and/or magnetic parameters of the motor.

Because of the inductance variation, it is also possible to look at the slope of the phase motor current di/dt. If the inductance of the system is maximal, e.g. with rotor alignment in the direction of two opposite energized coils, the resulting slope of the motor current di/dt is minimal.

U.S. Pat. No. 6,586,903 describes a method for determining the position of a moving rotor of a reluctance motor, which comprises sampling the phase current within a conduction period of a phase, e.g. by feeding the current of the motor into an input of an analog to digital (AD) converter. The method further comprises detecting when the phase current has passed its peak, computing when the peak current occurred, and determining the rotor position therefrom. For example, the commutation point may be observed in case two subsequent samples of the AD converter do not deliver any change in current anymore, i.e. when di/dt=0. A specific disadvantage of this method, as mentioned in this prior art document, may be a tendency to react to noise, e.g. detection of zero current slope may be unreliable. Detection of onset of downward slope is suggested as an alternative. The robustness may be further increased by requiring a minimum of consecutive downward slope signals.

Other sensorless methods use the freewheeling currents and thus non energized phases of the switched reluctance drive. A reference is given under U.S. Pat. No. 5,793,179. This method requires three series resistors as additional components in order to monitor the freewheeling current.

U.S. Pat. No. 6,979,974 describes a method for determining the position of a moving rotor of a reluctance motor. This method comprises applying a voltage to the phase winding having a waveform period independent from the period of rotor movement, e.g. applying voltage pulses during motor run; thus these voltage pulses provide current peaks in the motor current. The magnitude of the current peaks is influenced by the linked inductance and thus by the rotor position. This method comprises detecting a feature of the current waveform and deriving a position of the rotor from the occurrence of this feature. This feature may be a change of gradient of the current, for example the point of zero current slope di/dt. However in practice, as acknowledged in U.S. Pat. No. 6,979,974, detection of this point may have limitations and can be unreliable. An advantage of this method is that it will also provide position information for non-energized motors, e.g. during "coasting" of the motor. It is furthermore suggested that the onset of the downward slope is used instead as a more robust feature.

SUMMARY OF THE INVENTION

It is an object of embodiments of the present invention to provide robust and accurate rotor position information in a reluctance motor.

The above objective is accomplished by a method and device according to embodiments of the present invention.

In a first aspect, the present invention provides a method for determining the position of a moving rotor in a switched reluctance motor. The method comprises applying a voltage to a phase winding of the switched reluctance motor, sampling a signal representative of the current magnitude in said phase winding, detecting a feature of a second temporal derivative of said signal, and determining the position of the moving rotor taking into account the occurrence of said feature.

In a method according to embodiments of the present invention, said feature may comprise a zero crossing point of the second temporal derivative of said signal.

The determining of the position of the moving rotor may comprise determining the sign of a third temporal derivative of said signal when the occurrence of said feature has been detected.

In embodiments of the present invention, the determining of the position of the moving rotor may comprise comparing a first temporal derivative of said signal when the occurrence of said feature has been detected to a reference value of the first temporal derivative of the signal. Said reference value may be an average of the first temporal derivative of the signal.

In embodiments of the present invention, determining the position of the moving rotor may comprise detecting an alignment of the moving rotor with said phase winding.

A method according to embodiments of the present invention may furthermore comprise switching said voltage to a further phase winding of the reluctance motor when a predetermined position of the moving rotor has been determined.

In a second aspect, the present invention provides a device for determining the position of a moving rotor in a switched reluctance motor. The device comprises a current sensor for sampling a signal representative of the current magnitude in a phase winding of said switched reluctance motor while a voltage is applied to said phase winding, a feature detection unit for detecting a feature of a second temporal derivative of said signal, and a processing unit for determining the position of the moving rotor taking into account the occurrence of said feature.

In a device according to embodiments of the present invention, said current sensor may comprise an analog to digital converter for digitizing the current running through said phase winding.

In embodiments of the present invention, said feature detection unit may comprise a filter for calculating said second temporal derivative of the signal.

In embodiments of the present invention, said feature detection unit may comprise a zero-crossing detector for detecting said feature, said feature being a zero-crossing event of the second temporal derivative of said signal.

A device according to embodiments of the present invention may furthermore comprise a memory unit for storing a sequence of samples of said signal and/or second temporal derivatives of said signal.

A device according to embodiments of the present invention may furthermore comprise a power stage for powering said switched reluctance motor, and the processing unit may be adapted for generating a commutation signal for controlling said power stage.

In a third aspect, the present invention provides a system comprising a switched reluctance motor comprising a rotor and a device according to embodiments of the second aspect of the present invention for determining the position of said rotor in motion.

It is an advantage of embodiments of the present invention that robust detection of the zero crossing event of the phase current slope di/dt is provided.

It is an advantage of embodiments of the present invention that robust and accurate position information in a reluctance motor is provided that automatically adjusts to motor parameters and operational conditions, e.g. that does not require detailed a priori information about mechanical, electrical and/or magnetic properties of the reluctance motor.

It is an advantage of embodiments of the present invention that robust and accurate position information is provided that is computationally efficient, e.g. that does not require complex calculations.

It is an advantage of embodiments of the present invention that robust and accurate position information is provided that may be implemented in commonly available integrated circuitry for controlling reluctance motors.

Particular and preferred aspects of the invention are set out in the accompanying independent and dependent claims. Features from the dependent claims may be combined with features of the independent claims and with features of other dependent claims as appropriate and not merely as explicitly set out in the claims.

These and other aspects of the invention will be apparent from and elucidated with reference to the embodiment(s) described hereinafter.

Figure 1:
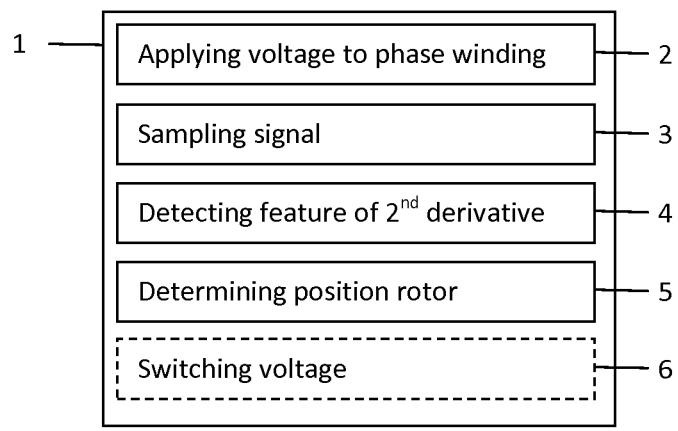
FIG. 1 shows an exemplary method according to embodiments of the present invention.

The drawings are only schematic and are non-limiting. In the drawings, the size of some of the elements may be exaggerated and not drawn on scale for illustrative purposes.

Any reference signs in the claims shall not be construed as limiting the scope.

In the different drawings, the same reference signs refer to the same or analogous elements.

DETAILED DESCRIPTION OF ILLUSTRATIVE EMBODIMENTS

The present invention will be described with respect to particular embodiments and with reference to certain drawings but the invention is not limited thereto but only by the claims. The drawings described are only schematic and are non-limiting. In the drawings, the size of some of the elements may be exaggerated and not drawn on scale for illustrative purposes. The dimensions and the relative dimensions do not correspond to actual reductions to practice of the invention.

Furthermore, the terms first, second and the like in the description and in the claims, are used for distinguishing between similar elements and not necessarily for describing a sequence, either temporally, spatially, in ranking or in any other manner. It is to be understood that the terms so used are interchangeable under appropriate circumstances and that the embodiments of the invention described herein are capable of operation in other sequences than described or illustrated herein.

Moreover, the terms top, under and the like in the description and the claims are used for descriptive purposes and not necessarily for describing relative positions. It is to be understood that the terms so used are interchangeable under appropriate circumstances and that the embodiments of the invention described herein are capable of operation in other orientations than described or illustrated herein.

It is to be noticed that the term "comprising", used in the claims, should not be interpreted as being restricted to the means listed thereafter; it does not exclude other elements or steps. It is thus to be interpreted as specifying the presence of the stated features, integers, steps or components as referred to, but does not preclude the presence or addition of one or more other features, integers, steps or components, or groups thereof. Thus, the scope of the expression "a device comprising means A and B" should not be limited to devices consisting only of components A and B. It means that with respect to the present invention, the only relevant components of the device are A and B.

Reference throughout this specification to "one embodiment" or "an embodiment" means that a particular feature, structure or characteristic described in connection with the embodiment is included in at least one embodiment of the present invention. Thus, appearances of the phrases "in one embodiment" or "in an embodiment" in various places throughout this specification are not necessarily all referring to the same embodiment, but may. Furthermore, the particular features, structures or characteristics may be combined in any suitable manner, as would be apparent to one of ordinary skill in the art from this disclosure, in one or more embodiments.

Similarly it should be appreciated that in the description of exemplary embodiments of the invention, various features of the invention are sometimes grouped together in a single embodiment, figure, or description thereof for the purpose of streamlining the disclosure and aiding in the understanding of one or more of the various inventive aspects. This method of disclosure, however, is not to be interpreted as reflecting an intention that the claimed invention requires more features than are expressly recited in each claim. Rather, as the following claims reflect, inventive aspects lie in less than all features of a single foregoing disclosed embodiment. Thus, the claims following the detailed description are hereby expressly incorporated into this detailed description, with each claim standing on its own as a separate embodiment of this invention.

Furthermore, while some embodiments described herein include some but not other features included in other embodiments, combinations of features of different embodiments are meant to be within the scope of the invention, and form different embodiments, as would be understood by those in the art. For example, in the following claims, any of the claimed embodiments can be used in any combination.

In the description provided herein, numerous specific details are set forth. However, it is understood that embodiments of the invention may be practiced without these specific details. In other instances, well-known methods, structures and techniques have not been shown in detail in order not to obscure an understanding of this description.

In a first aspect, the present invention relates to a method for determining the position of a moving rotor in a reluctance motor. This method comprises the step of applying a voltage to a phase winding of the reluctance motor. The method further comprises sampling a signal representative of the current magnitude in the phase winding and detecting a feature of the second temporal derivative of this signal. The method furthermore comprises the step of determining the position of the moving rotor taking into account the occurrence of this feature.

Referring to FIG. 1, a method 1 according to embodiments of the present invention for determining the position of a moving rotor in a reluctance motor, for example a switched reluctance motor, e.g. a switched reluctance motor operating in a medium speed range, is illustrated. A medium speed range may correspond to operation of the motor, e.g. when a stable hysteresis regime is established, e.g. after an initial start-up phase of the motor (e.g. rotor alignment to the stator field and rotor acceleration), but operation at a moderate speed such that, for example, back electromotive force contributions and fast heat-induced resistive changes may be neglected in modeling the electro-mechanic behavior of the motor. A typical medium speed range could be between 10 and 100 rps (rotations per second). This reluctance motor may be an electric motor that comprises a rotatably mounted ferromagnetic rotor, e.g. an iron rotor or a rotor made of a soft magnetic material, such as laminated silicon steel. The rotor may also comprise multiple protrusions, e.g. for providing salient magnetic poles through magnetic reluctance. The motor further may comprise a stator having multiple stator poles with phase windings, e.g. electric windings for inducing a non-permanent magnetic field in the iron rotor along multiple directions corresponding to the stator pole orientations. While these electric windings may be electrically coupled in a predetermined manner, such as in synchronous reluctance motors, the stator poles may also be electrically insulated and separately controllable, such as in switched reluctance motors.

The number of protrusions on the rotor may typically be different from the number of stator poles in order to minimize torque ripple and for preventing complete alignment of the rotor protrusions and the stator poles. A partial alignment remains however possible, e.g. in which two or more rotor protrusions completely face two or more stator poles. Such partial alignment, which may simply be referred to as an "aligned position", corresponds to a position of minimum reluctance of the motor. When a stator pole is active, e.g. when its winding is conducting an electric current, a torque is effected on the rotor to minimize the reluctance, e.g. rotating the rotor toward an aligned position, e.g. similar to the phenomenon of attraction of non-magnetized iron to a permanent magnet. A switched reluctance motor provides electronic commutation, e.g. switching of the active windings of the stator poles, in order to achieve a desired operational mode, e.g. a desired rotation sense and/or a speed preference, and a smooth torque coupling. In order to achieve a full rotation of the motor, the windings need to be energized sequentially corresponding to a timing tuned to the position of the rotor.

The method 1 comprises the step of applying 2 a voltage to a phase winding of the reluctance motor. For example, the phase voltage may be maintained at a predetermined voltage level, e.g. a reference supply voltage, or the phase voltage may be regulated in a controlled manner, for example, may be ramped up or ramped down, e.g. following a linear transition as function of time from a first voltage level, e.g. an electrical ground, to a second voltage level, e.g. a reference supply voltage. The phase voltage may be regulated in a more complex manner, e.g. following a non-linear predetermined function of time. The method 1 may furthermore comprise the step of switching this voltage to a further phase winding of the reluctance motor when a predetermined position of the moving rotor has been determined 5, e.g. as discussed further herein. For example, when a aligned position of the rotor is reached with respect to the applied voltage on the phase winding, the voltage on this phase winding may be switched off and a voltage may be applied to a further phase winding, e.g. the next phase winding in the direction of rotation of the rotor. Also, in this example, the voltage on the first phase winding may be gradually decreased, e.g. ramped down, while the voltage on the next phase winding may be gradually increased, e.g. ramped up, such that a smooth rotation of the motor may be achieved.

The method 1 further comprises sampling 3 a signal representative of the current magnitude in the phase winding, e.g. the phase winding to which a voltage is applied 2. For example, a analog to digital converter may be electrically coupled to the phase winding in order to obtain a measurement signal or plurality of measurement signals charactering the current magnitude. Such signal representative of the current magnitude may be derived from the current intensity or electrical power running through the phase winding. The sampling may for example be performed at a frequency, that is directly proportional to the electrical motor speed and the requested resolution. E.g. for a switched reluctance motor with 5000 rpm and a rotor with 14 teeth and a resolution of 100 samples per electrical revolution, the sampling rate may e.g. be 116 kHz. Furthermore, this signal may be filtered, e.g. in order to reduce the influence of noise, for example, by means of a low pass filter to exclude high frequency noise, e.g. at frequencies higher than the frequency of phase commutation.

The method 1 also comprises detecting 4 a feature of the second temporal derivative of this signal. This detecting 4 of the feature may comprise determining the second temporal derivative of the signal, for example, by calculating a second order finite difference approximation for the second derivative applied on the signal, e.g. a backward second order difference applied to the current signal sample and a plurality of previous signal samples stored in a memory, e.g. applied to the at least three most recent signal samples. Furthermore, this determining of the second temporal derivative may be combined with filtering operations, e.g. for noise reduction as described hereinabove in relation to the sampling 3. For example, a second order finite difference may be combined by an appropriate discrete implementation for smoothing the signal, e.g. a discrete filter determined by convolving a Gaussian smoothing kernel with a second order derivative operator.

In detecting 4 this feature, the feature may comprise the zero-crossing point of the second temporal derivative of the signal. The zero-crossing point of this second temporal derivative may correspond to either the maximum or the minimum of the first temporal derivative of the phase current, e.g. the phase current slope. Furthermore, due to a qualitative link between the inductance and the phase current slope, this maximum or minimum of the phase current slope furthermore may correspond in good approximation to respectively the minimum or the maximum of the inductance, and hence to respectively an unaligned or an aligned position of the rotor. This feature may furthermore be detected in a robust manner such that noise effects can be reduced, for example, by evaluating a number of samples in a time window. For example, when a change of sign is detected for the second temporal derivative of the current magnitude, at least one additional sample may be evaluated to ensure that the change of sign persists, e.g. agrees with a zero-crossing of the second temporal derivative of the current magnitude. While such zero-crossing feature may be detected by monitoring sign changes of the second temporal derivative, alternative methods may be used to detect the zero-crossing feature, for example, the feature may comprise comparing a value of the second temporal derivative to a threshold value, such that a zero-crossing is assumed when the second temporal derivative is smaller than this threshold value, for example, a small fraction of an average, maximum or dynamic range of the second temporal derivative, e.g. a threshold of 1% thereof.

The method 1 furthermore comprises the step of determining 5 the position of the moving rotor taking into account the occurrence of this feature. Determining 5 the position of the moving rotor may include determining whether the rotor is in a predetermined position, for example an aligned or unaligned position. Determining 5 the position of the moving rotor may also include determining a current location and speed of the rotor, e.g. in order to enable accurate modeling and prediction of the movement of the rotor.

An occurrence of the feature, e.g. the zero-crossing of the second temporal derivative of the signal, may correspond to an unaligned or an aligned rotor position, therefore determining 5 the position may comprise taking into account the sign of the third temporal derivative of the signal at the moment of occurrence of the feature. For example, if this third derivative is positive, the rotor position may be determined to be an aligned position, e.g. the aligned position corresponding to the current phase winding being supplied 2.

Alternatively, when the feature is detected, e.g. the zero-crossing of the second temporal derivative of the signal is detected, the first temporal derivative of the signal may be compared to an average value of this first temporal derivative of the signal. For example, if the first temporal derivative of the signal is larger than this average, the zero-crossing of the second temporal derivative may correspond to a maximum of the first temporal derivative, and therefore the position of the rotor may be determined to be in an unaligned position. Calculating such average may comprise calculating $(slope_{max}+slope_{min})/2$, in which $slope_{max}$ corresponds to a maximum of the first temporal derivative of the signal and $slope_{min}$ to a minimum of the first temporal derivative of the signal. For example, the last two values of the first temporal derivative of the signal observed on detecting the last two occurrences of the feature may be stored, and an average value for the first temporal derivative of the signal may be updated based on these two previous values, e.g. for comparing to a new value of the first temporal derivative of the signal when detecting the next occurrence of the feature. It is an advantage of such repeated calculation, e.g. continuous updates, of this average value, that the influence of noise and inaccurate measurements may be reduced and that changes to the average value over time, e.g. due to the dependence of the inductance on the current, may be compensated accordingly. In embodiments of the present invention, alternatively a running average of more than two previous values may be used, for example, assuming that the detected features correspond to an alternating sequence of maxima and minima of the first derivative of the signal, the value of the first derivative of the signal $slope_k$ at the k'th occurrence of the feature may be compared to an average of the first derivative of the signal constructed as $$\frac{1}{2N} \sum_{i=k-2N}^{k-1} slope_i$$

based on the previous 2N occurrences of the feature.

Furthermore, such running average may be a weighted average, e.g. assigning a weight to each of the previous values, for example, such that the relative contribution of older values is reduced.

Furthermore, determining 5 the position of the rotor may comprise determining a time interval between occurrences of this feature, e.g. a time interval between two zero-crossings of the second temporal derivative of the signal, for example a time interval between two, successive zero-crossings. This time interval may be used to determine the angular velocity of the rotor, which may be used to accurately determine the position of the rotor as function of time, e.g. taking into account a lapsed time interval for sampling and processing, and/or to predict the position of the rotor at a future point in time, e.g. when a reference position, such as an aligned or unaligned position, has been determined such as described hereinabove. Therefore, in controlling the commutation of the motor, e.g. switching 6 the phase voltage, a complex commutation scheme may be implemented, e.g. a phase voltage to be applied to the phase windings in function of rotor position, in which this rotor position does not necessarily correspond to an aligned or unaligned position. For example, an angular position between an unaligned and an aligned position may be defined for starting a decrease of the voltage applied over the currently active phase winding and/or starting an increase of the voltage to be applied over the next phase winding to become active.

It may for example be assumed that, during steady operation of the motor, the angular velocity may be substantially constant, for example changes by less than 5%, e.g. less than 1%, or even less than 0.1%, from one period to the next, e.g. in passing from one aligned position of the rotor to the next aligned position of the rotor. Therefore, a rotor position estimate may be continuously updated taking into account the angular velocity, e.g. determined by measuring a time interval between recent occurrences of the feature, and the most recent aligned and/or unaligned position of the rotor, e.g. as determined by point in time of a recent occurrence of the feature. Moreover, estimation errors may only accumulate over a single commutation period, as both the velocity and the reference position, e.g. aligned or unaligned position, may be updated in each commutation period.

In embodiments of the present invention, the method 1 may furthermore comprise the step of switching 6 the voltage to a further phase winding of the reluctance motor when a predetermined position of the moving rotor has been determined. For example, the method 1 may comprise executing a phase commutation event in response to the determined position, e.g. when an aligned position has been detected.

Figure 7:
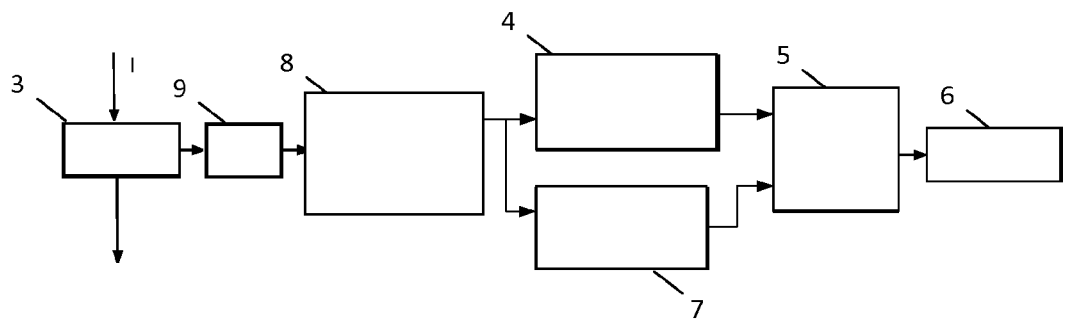
FIG. 7 shows a control diagram for a reluctance motor according to embodiments of the present invention.

Referring to FIG. 7, an exemplary control diagram for a reluctance motor according to embodiments of the present invention is shown. A signal representative of the current magnitude in a currently active phase winding of a reluctance motor is sampled 3, e.g. a current is sensed. This signal may be filtered, e.g. in order to compensate measurement noise in the signal. The filtered signal may then be used to calculate 8 a derivative of the signal, e.g. to calculate a second temporal derivative. Furthermore, the first temporal derivative and/or the third temporal derivative may also be calculated. A feature of the second temporal derivative is then detected 4, for example a zero-crossing of the second temporal derivative of the signal. A position of the rotor is furthermore determined 5 taking into account the occurrence of this feature. This may involve an evaluation 7 of the first or third derivative as described hereinabove, e.g. evaluating a zero-crossing event selection criterion in order to select an occurrence of this feature which corresponds to a specific position of the rotor such as an aligned position. Finally, a commutation event for the motor 15 may be generated, e.g. the applied voltage may be switched 6 to a next phase winding in response to the determined position of the rotor.

Figure 2:
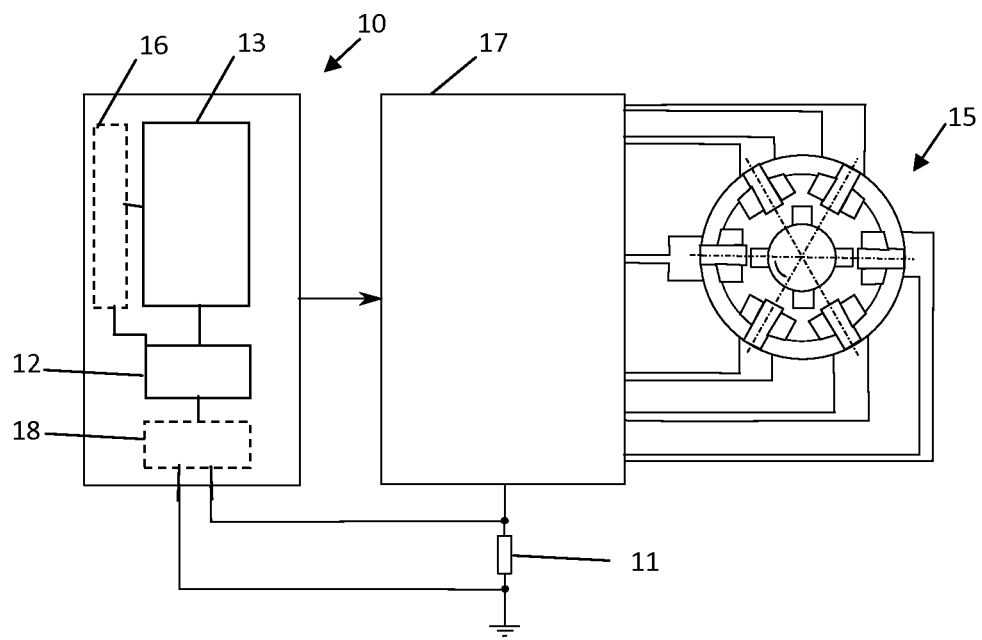
FIG. 2 illustrates a device according to embodiments of the present invention.

Referring to FIG. 2, the present invention relates in a second aspect to a device 10 for determining the position of a moving rotor in a reluctance motor 15. Such device 10 comprises a current sensor 11 for sampling a signal representative of the current magnitude in a phase winding of the reluctance motor 15 while a voltage is applied to this phase winding, e.g. for sampling a signal representative of the current magnitude in a currently active phase winding of the reluctance motor 15. The device 10 furthermore comprises a feature detection unit 12 for detecting a feature of the second temporal derivative of said signal, and a processing unit 13 for determining the position of the moving rotor taking into account the occurrence of this feature. The device 10 according to embodiments of the present invention may be adapted for implementing a method according to the first aspect of the present invention.

In embodiments of the present invention, the current sensor 11 may comprise an analog to digital converter 18 for digitizing the current running through the phase winding.

The feature detection unit 12 may comprise a filter for calculating the second temporal derivative of the signal, for example a finite differencing unit for calculating a discrete approximation to the second temporal derivative of the signal. This filter may furthermore be adapted for filtering out a noise component in this signal, for example, high frequency noise corresponding to frequencies above the expected dynamic range of the information content in the signal. This noise filtering may be provided in accordance with a maximum speed of the motor 15 in normal operation. Furthermore, the filter may additionally provide the first and/or the third temporal derivative of the signal, e.g. store these values in a memory unit 16, for example such that these values may be provided to the processing unit 13.

The feature detection unit 12 may furthermore comprise a zero-crossing detector for detecting the feature, in which this feature is a zero-crossing event of the second temporal derivative of the signal. For example, this zero-crossing detector may detect a change of sign of the second temporal derivative of the signal.

The device 10 may furthermore comprise a memory unit 16 for storing a sequence of samples of the signal and/or the second temporal derivatives of the signal. For example, values provided by the analog to digital converter 18 may be stored in a buffer, e.g. such that a list of most recent values are maintained in memory. These stored values may be provided to the feature detection unit 12, e.g. to a filter component thereof, for calculating the second temporal derivative of the signal. This second temporal derivative may also be stored in memory, or directly provided to the zero-crossing detector for deciding whether the feature has occurred, e.g. whether a zero-crossing of the second temporal derivative of the signal has occurred. A sequence of stored second temporal derivatives, e.g. stored in memory, may be used to provide a more robust detection of zero-crossings, e.g. when a zero-crossing has been detected in a previous sampling point, e.g. time instance, the following sampling point, e.g. time instance, may be evaluated to confirm the zero-crossing.

In embodiments of the present invention, the processing unit 13 may be adapted for determining the sign of the third temporal derivative of the signal when the occurrence of the feature has been detected. For example, when the sign of the third temporal derivative is established to be positive, the position of the rotor of the reluctance motor 15 may be determined to be an aligned position, e.g. corresponding to the aligned position of the currently active phase winding. Similarly, when the sign of the third temporal derivative is established to be negative, the position of the rotor may be determined to be an unaligned position, e.g. corresponding to the unaligned position between the currently active phase winding and the phase winding which was previously active during a previous commutation phase of the motor.

In embodiments of the present invention, the processing unit 13 may be adapted for comparing the first temporal derivative of the signal to an average value of this first temporal derivative of the signal. For example, a mean value for the first temporal derivative of the signal may be continuously updated, e.g. calculated for the previous two occurrences of the feature, or for the previous four occurrences of the feature, and the current value of the first temporal derivative may be compared to this calculated mean value. If the current value is greater than this mean value, the position of the rotor may be determined to be an unaligned position, while if this current value is smaller than the mean value, the position of the rotor may be determined to be an aligned position. It will be clear to a person skilled in the art that other variations of this principle may apply in embodiments of the present invention. For example, a current value of the first temporal derivative, e.g. when the feature has been detected, may be compared to a previous version of the first temporal derivative, e.g. stored on the previous occurrence of the feature, and the position may be determined to be aligned when this current value is smaller than the previous value, or unaligned when this current value is greater than the previous value. Alternatively, a larger number of previous values may be used to determine the mean value for the first temporal derivative of the signal, e.g. in order to provide a more robust determination of the position of the rotor. This may be advantageous when the amplitude of this first temporal derivative over time is small, e.g. comparable to the amplitude of noise present in this first temporal derivative.

The device 10 may furthermore comprise a power stage 17 for powering the reluctance motor 15. The processing unit 13 may be adapted for generating a commutation signal for controlling the power stage 17, e.g. for controlling a transfer of applied voltage from one phase winding to a next phase winding of the reluctance motor 15.

In a third aspect, the present invention relates to a system comprising a reluctance motor 15, which comprises a rotor, and a device 10 according to the second aspect of the present invention.

Principles of the present invention may be understood by following theoretical considerations, the present invention not being intended to be limited by such theoretical considerations in any way. The inductance $L_d(\Theta, i_p)$ can be qualitatively be described as a trigonometric function of rotor position in time and the current, e.g. a sinusoid, which is transposed upward relative to the zero inductance axis, e.g. positively biased. This vertical shift can be determined by calculating the mean value of the extrema of this function. Since the current slope, e.g. the first temporal derivative of the phase current, is qualitatively similar to, but inversed with respect to, the inductance, information about the position of the rotor may be gained from the average current slope, e.g.

$$\frac{\left(\frac{di_p}{dt}\right)_{max} + \left(\frac{di_p}{dt}\right)_{min}}{2},$$

and the current slope amplitude, e.g. the half amplitude of the current slope $$\frac{\left(\frac{di_p}{dt}\right)_{max} - \left(\frac{di_p}{dt}\right)_{min}}{2}.$$

In embodiments of the present invention, as illustrated in FIG. 7, a Current Sensing device 4 provides motor current information over time. The sensing might be done with an AD converter. The current information over time might be stored in a memory. A Filter 5 might provide the motor current information. In embodiments of the present invention, The voltage $u_p$ which is applied on a phase winding can be represented as the sum of a resistive part $u_{Ohm}$ and an inductive part $u_{ind}$:

$$u_p = u_{Ohm} + u_{ind} = R_p i_p + \frac{d}{dt}(L_d(\Theta, i_p), i_p),$$

in which the inductance $L_d(\Theta, i_p)$ depends on the angular position of the rotor $\Theta$ and the current running through the phase winding $i_p$. This can be further refined into $$u_p \cong u_{Ohm} + u_{indCurrent} + u_{indMotion}$$

$$= R_p i_p + L_d(\Theta, i_p)\frac{\partial i_p}{\partial t} + \frac{\partial L_d(\Theta, i_p)}{\partial \Theta}\omega i_p,$$

with $\omega\dot\Theta$ the angular velocity of the rotor, and in which $u_{indCurrent}$ denotes the contribution to the inductive voltage part due to a changing current and $u_{indMotion}$ denotes the contribution to the inductive voltage part due to a changing position of the rotor. It should be noted that a further term $$\frac{\partial L_d(\Theta, i_p)}{\partial i_p}\frac{\partial i_p}{\partial t}i_p$$

may be considered negligible for the purposes of the present invention. The term $u_{indMotion}$ due to a changing position of the rotor is known as a counter-electromotive force or back electromotive force (BEMF). Although the inductance also changes as function of the current, it can be seen from $u_{indMotion}$ that, for a constant supply voltage $u_p$, a qualitative relation between the inductance $L_d(\Theta, i_p)$ and the first temporal derivative of the current $$\frac{\partial i_p}{\partial t}$$

exists on the rising and falling flanks of the phase current, e.g. when the temporal derivative of the current $$\frac{\partial i_p}{\partial t}$$

dominates the current $i_p$. For example, when the current slope becomes more steep, the inductance becomes smaller. Therefore, information about the actual position of the rotor may be gained by observing the extrema of the first derivative of the current. Since the angle is predetermined between the aligned positions and the neighboring unaligned positions, e.g. the relative angular positions of maximum and minimum inductance, the time intervals between the zero crossings of the second temporal derivative of the current may be used to determine the position.

Figure 3:
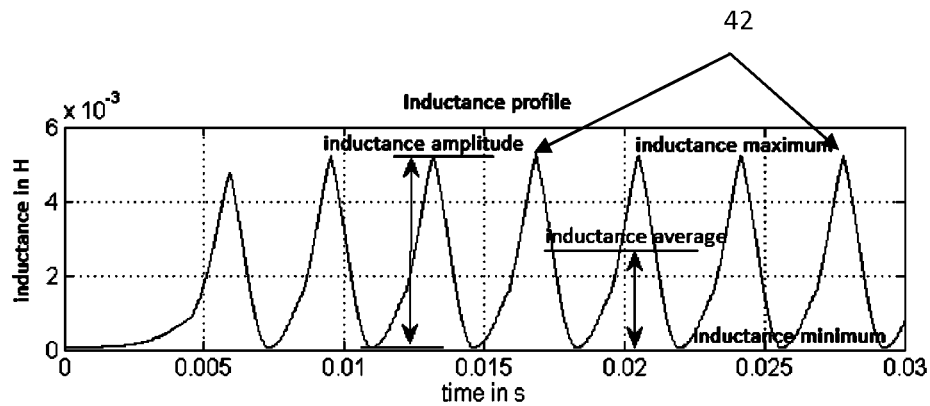
FIG. 3 shows an exemplary inductance profile as function of time in a reluctance motor such as used in combination with embodiments of the present invention.

For illustration, the inductance of the motor seen from one phase for a rotating rotor is shown in FIG. 3. In first instance it can be shown as a trigonometric function. A maximum inductance 42 is equivalent to an optimal alignment of the stator pole with the corresponding rotor pole, e.g. an aligned position. Because of the fact that the rate in change of phase current is qualitative similar to the inverse inductance trend, it is possible to find the inductance maximum 42 of a phase, and hence an aligned position, in accordance with embodiments of the present invention, by looking for the phase current slope's minimum. Because the inductance is approximately following a trigonometric function, the current slope will follow a similar trigonometric function too.

Figure 4:
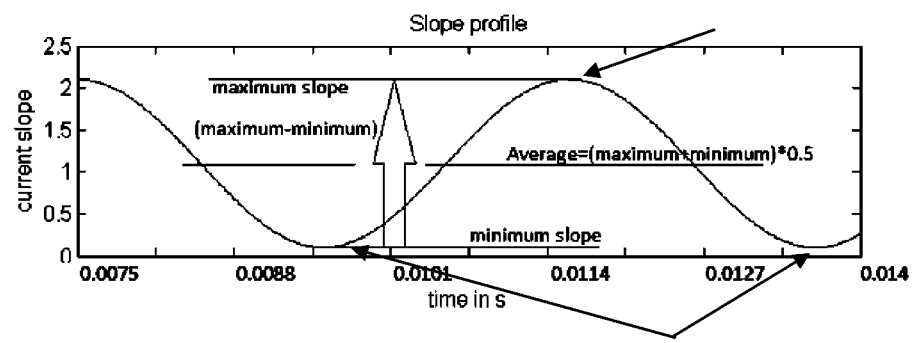
FIG. 4 shows an exemplary current slope trace for illustrating principles of embodiments of the present invention.
Figure 5:
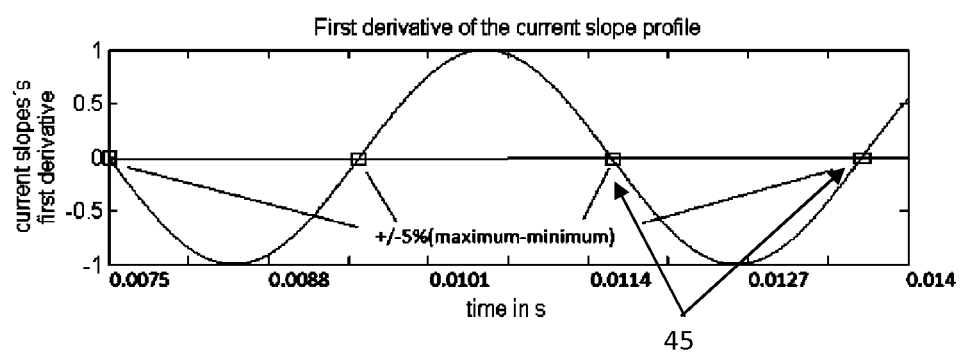
FIG. 5 shows an exemplary first temporal derivative of a current slope for illustrating principles of embodiments of the present invention.
Figure 6:
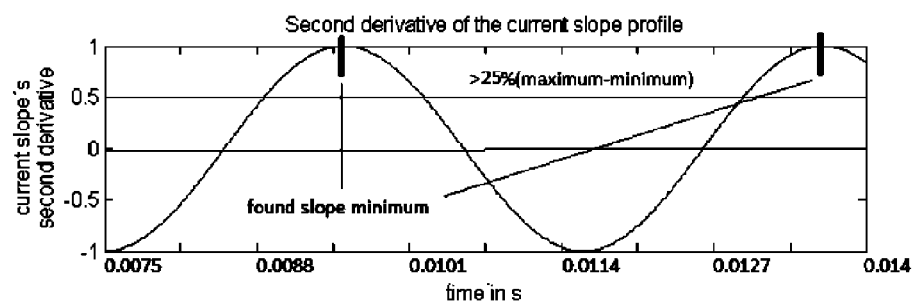
FIG. 6 shows an exemplary second temporal derivative of a current slope for illustrating of principles of embodiments of the present invention.

The phase current slope $$\frac{di_p}{dt}$$

is given as the first temporal derivative of the phase current. An exemplary current slope trace is shown in FIG. 4. It is to be noted, that only the point of the local current slope's minimum 44 may be point of interest. An exemplary second temporal derivative $$\frac{d^2 i_p}{dt^2}$$

of the motor phase current, thus the first temporal derivative of the phase current slope, is shown in FIG. 5. The local maximum 43 or minimum 44 of the phase current slope $$\frac{di_p}{dt}$$

now corresponds with the Zero Crossing Events 45 of the second temporal derivative of the motor phase current. In order to select the right Zero Crossing Event for the commutation information, e.g. the zero crossing event which corresponds to the current slope's minimum 44, several selection criteria may be applied according to embodiments of the present invention. For example, such selection may take the second derivative of the current slope into account, e.g. the third temporal derivative of the phase current, of which an exemplary trace is shown in FIG. 6.

Embodiments of the present invention are able to operate a switched reluctance motor just by observation of the 2nd derivative of the motor current and a self adaptive criterion to select the correct timing event to generate the information for the motor commutation. It may not be needed to know any specific motor parameters. It may also not be needed to work with difficult threshold conditions. The method provided by embodiments of the present invention may be self adapting, so that there is also no need to build up any fixed threshold setting for generation of the motor commutation.

Therefore, in a method according to embodiments of the present invention, a position of a moving rotor in a reluctance motor may be determined based only on the measurement of the current phase current. Since the inductance is a function of the current and rotor position, this property can be used to make a statement about the state of the rotor. However, as shown in several prior art methods, the current slope may not only be a function of the rotor position but also a function of the current itself. Generating and using a lookup table to get information for every specific angle/current-combination in order to extract the rotor position information may be cumbersome. However, by a method according to embodiments of the present invention, no such lookup table may be required.

The invention claimed is:

1. A device configured to determine the position of a moving rotor in a switched reluctance motor, comprising:
a current sensor that samples a signal representative of the current magnitude in a phase winding of said switched reluctance motor while a voltage is applied to said phase winding,
a feature detection unit that detects a feature of a second temporal derivative of said signal, and
a processing unit that determines the position of the moving rotor taking into account an occurrence of said feature,
wherein said occurrence of said feature corresponds to an unaligned or an aligned rotor position,
wherein said feature detection unit comprises a zero-crossing detector arranged to detect said feature, said feature being a zero-crossing event of the second temporal derivative of said signal,
wherein said determining of the position of the moving rotor comprises determining the sign of a third temporal derivative of said signal when the occurrence of said feature has been detected, wherein a positive sign of the third temporal derivative of said signal corresponds to an aligned rotor position, wherein said aligned rotor position corresponds to a position of minimum reluctance of the motor.

2. The device according to claim 1, in which said current sensor comprises an analog to digital converter that digitizes the current running through said phase winding.

3. The device according to claim 1, wherein said feature detection unit comprises a filter configured to filter said second temporal derivative of the signal.

4. The device according to claim 1, furthermore comprising a memory unit configured to store a sequence of samples of at least one of said signal and second temporal derivatives of said signal.

5. The device according to claim 1, furthermore comprising a power stage configured to power said switched reluctance motor, wherein said processing unit generates a commutation signal to control said power stage.

6. A system comprising a switched reluctance motor comprising a rotor and a device according to claim 1 that determines the position of said rotor in motion.

7. A method for determining the position of a moving rotor in a switched reluctance motor comprising:
applying a voltage to a phase winding of the switched reluctance motor,
sampling a signal representative of the current magnitude in said phase winding by using a current sensor,
detecting a feature of a second temporal derivative of said signal by using a feature detection unit, wherein said feature comprises a zero crossing point of the second temporal derivative of said signal, and
determining the position of the moving rotor taking into account an occurrence of said feature using a processing unit, wherein an occurrence of said feature corresponds to an unaligned or an aligned rotor position,
wherein said determining of the position of the moving rotor comprises determining the sign of a third temporal derivative of said signal when the occurrence of said feature has been detected, wherein a positive sign of the third temporal derivative of said signal corresponds to an aligned rotor position, wherein said aligned rotor position corresponds to a position of minimum reluctance of the motor.

8. The method according to claim 7, wherein said determining of the position of the moving rotor comprises comparing a first temporal derivative of said signal when the occurrence of said feature has been detected to a reference value of the first temporal derivative of the signal.

9. The method according to claim 8, wherein said reference value is an average of the first temporal derivative of the signal.

10. The method according to claim 7, wherein said determining the position of the moving rotor comprises detecting an alignment of the moving rotor with said phase winding.

11. The method according to claim 7, furthermore comprising switching said voltage to a further phase winding of the switched reluctance motor when a predetermined position of the moving rotor has been determined.

* * * * *